United States Patent Office 3,206,425
Patented Sept. 14, 1965

3,206,425
COPOLYMERS HAVING SELF-CROSS-LINKING PROPERTIES
Erwin Müller, Leverkusen, and Karl Dinges, Cologne-Stammheim, Germany, assignors to Farbenfabriken Bayer Aktiengesellschaft, Leverkusen, Germany, a German corporation
No Drawing. Filed July 19, 1962, Ser. No. 211,102
Claims priority, application Germany, Aug. 3, 1961, F 34,599
9 Claims. (Cl. 260—29.6)

The present invention relates to stable aqueous emulsions of copolymers having self-cross-linking properties as well as a process for producing such copolymer emulsions. Furthermore this invention deals with cross-linked copolymers obtained by cross-linking said uncross-linked polymeric materials.

It is known that aqueous dispersions of self-cross-linking copolymers may be prepared by co-polymerising acrylic acid amides or methacrylic acid amides, in which the amide groups have been substituted by a methylol or methylol alkyl ether group, with other olefinically unsaturated monomers in aqueous emulsions. It has also been suggested to subject Mannich bases of acrylic and methacrylic acid amides to co-polymerisation in aqueous emulsion with other olefinically unsaturated monomers.

Co-polymers, which have self-cross-linking properties, are obtained, by these processes because they can be converted into cross-linked insoluble co-polymers under the influence of heat and/or acid catalysts. However, aqueous dispersions of these co-polymers still need improving for certain purposes. It is, for example, known that when co-polymers containing free methylol groups are left to stand for some time at room temperature, they slowly undergo cross-linking and thereby become useless. The co-polymers containing methylol ether groups do not show this behaviour, but on the other hand the cross-linking temperatures of the films prepared from these emulsions are too high for some purposes. In practice, it is desirable to have co-polymers which can be stored indefinitely as emulsions but whose films become insoluble at room temperature or at only a slightly higher temperature when dry.

Another new class of acrylic acid amide derivatives has been found, whose co-polymers with other polymerisable compounds give aqueous co-polymer dispersions which are extremely stable towards cross-linking when stored at room temperature and the films, coatings and the like of which can be readily insolubilized by self-cross-linking.

Monomeric acrylic acid amide derivatives which may be used for preparing co-polymers of this type which are capable of self-cross-linking may be represented by the following general Formula I $$CH_2=C-CO-NH-CH_2-N\begin{matrix}C-R_2\\ \|\\ O\end{matrix}\begin{matrix}\\ R_3\end{matrix}$$

$$I$$

In this formula
$R_1$ stands for a hydrogen atom, a methyl group or a chlorine atom
$R_2$ stands for a saturated alkyl radical with preferably 1–8 carbon atoms, an aryl radical, a cyclo alkyl radical or an aralkyl radical
$R_3$ stands for a hydrogen atom, a saturated alkyl radical with preferably 1 to 8 carbon atoms, an aryl radical, a cyclo alkyl radical or an aralkyl radical and
$R_2$ and $R_3$ together with the adjacent nitrogen atom and the carbonyl group may represent part of a heterocyclic ring containing nitrogen as member of the ring.

Of particular importance are compounds according to the aforementioned Formula I wherein $R_2$ and $R_3$ together represent an alkylene group —$(CH_2)_n$— where $n$ is a whole number between 3 and 5, i.e. wherein the residue $$-N\begin{matrix}C-R_2\\ \|\\ O\end{matrix}\begin{matrix}\\ R_3\end{matrix}$$

in the above formula reads as follows:

[three cyclic structures shown: a pyrrolidinone-type ring with $CH_2$ substituent, a methyl-substituted variant, and a six-membered ring variant]

Furthermore there are of interest compounds wherein said residue $$-N\begin{matrix}C-R_2\\ \|\\ O\end{matrix}\begin{matrix}\\ R_3\end{matrix}$$

represents a heterocyclic ring system according to the formulae

[phthalimide-type structure] and [dimethyl-substituted succinimide-type structure]

Although other heterocyclic ring systems are possible, there are of preferred interest five and six-membered heterocyclic ring systems containing as ring atoms besides carbon atoms only one nitrogen atom. In this case, the temperatures required for cross-linking within short periods (i.e. 30 seconds up to 5 minutes) are generally lower than those for analogous acrylic amide methylol ethers.

In the process described here, the acrylic amide derivatives, especially the compound represented by the general Formula I, should be polymerised to the co-polymer of the co-polymer dispersion in quantities of 0.5 to 50% preferably 0.5 to 15% calculated on the total quantity of monomer used.

The following are examples of compounds of the above type:

(1) $$CH_2=CH-CO-NH-CH_2-N\begin{matrix}CO-CH_2\\ \\ CH_2-CH_2\end{matrix}$$

(2) $$CH_2=CH-CO-NH-CH_2-N\begin{matrix}CO-CH_2\\ \\ CH_2-CH_2\end{matrix}CH_2$$

(3) $$CH_2=CH-CO-NH-CH_2-N\begin{matrix}CO-CH_2-CH_2\\ \\ CH_2-CH_2-CH_2\end{matrix}$$

(4) $$CH_2=C-CO-NH-CH_2-N\begin{matrix}CO-CH_2\\ \\ CH_2-CH_2\end{matrix}$$
    $\quad\quad\;\;|$
    $\quad\;\;CH_3$ (5) $$CH_2=C-CO-NH-CH_2-N\begin{matrix}CO-CH_2\\ \\ CH_2-CH_2\end{matrix}CH_2$$
    $\quad\quad\;\;|$
    $\quad\;\;CH_3$ (6)

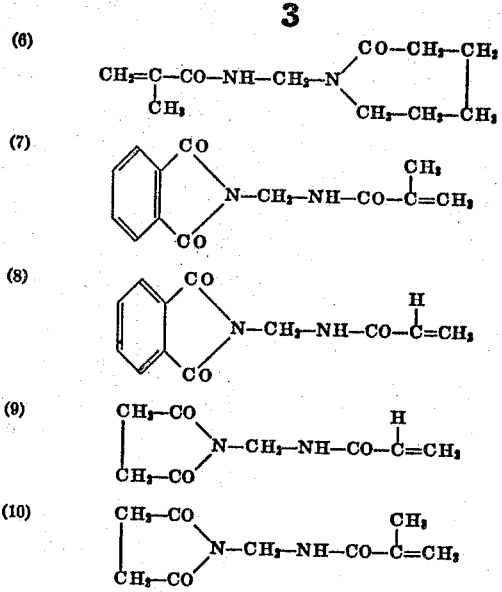

Compounds wherein $R_2$ according to Formula I represents a saturated alkyl radical with 1 to 8 carbon atoms and whereby at the same time $R_3$ according to Formula I stands for a hydrogen atom are furthermore of interest. Examples are:

(11) $CH_3-CO-NH-CH_2-NH-CO-\underset{\underset{CH_3}{|}}{C}=CH_2$

(12) $CH_3-CO-NH-CH_2-NH-CO-CH=CH_2$

(13) $H_5C_2OOC-\underset{\underset{H}{|}}{N}-CH_2-NH-CO-\underset{\underset{CH_3}{|}}{C}=CH_2$ and

(14) $H_5C_2OOC-\underset{\underset{CH_3}{|}}{N}-CH_2-NH-CO-\underset{\underset{CH_3}{|}}{C}=CH_2$ (15)

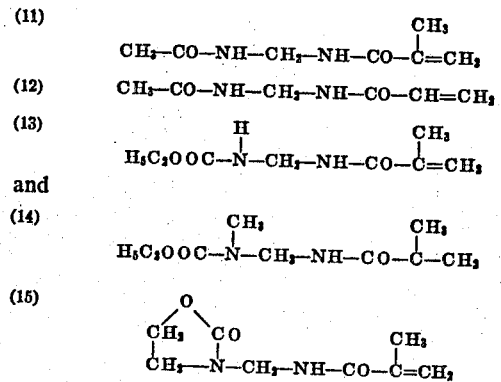

as well as the corresponding acrylic acid analogues of the compounds of Formulae 13 to 15. It is obvious that in Formulae 11, 12, 13 and 14 the alkyl radicals corresponding to $R_2$ of Formula I respectively in Formula 14 also $R_3$, i.e. methyl and ethyl may be substituted by higher alkyls such as propyl, butyl, octyl etc.

Compounds of the above type may for example be obtained by the process described in previously copending and now abandoned application Serial No. 203,468, as filed June 19, 1962, by reacting a methylol ether of a saturated acid amide or a methyl ether of a saturated urethane in the presence of an acid catalyst with an acid amide containing a polymerisable carbon-carbon double bond.

It is, of course, possible to use mixtures of the abovementioned compounds instead of one or other separately.

Suitable olefinic monomers which may be co-polymerised with compounds of the above type are copolymerizable monomers having at least one terminal $CH_2=C<$ grouping and may advantageously be taken from the following classes of compounds.

(a) α,β-Olefinically unsaturated monocarboxylic acids and their derivatives, for example esters of acrylic and methacrylic acid with saturated monohydric aliphatic or cycloaliphatic alcohols containing 1 to 20 carbon atoms, acrylic and methacrylic acid amides and acrylonitrile and methacrylonitrile.

(b) Aromatic vinyl compounds such as styrene, α-methylstyrene, dichlorostyrene and other derivatives.

(c) Aliphatic vinyl and vinylidene compounds such as vinyl ethers, vinyl esters, vinyl ketones, vinyl halides, e.g. vinyl chloride, vinyl acetate, vinyl propionate, vinyl ether ethyl and vinylidene chloride.

(d) Conjugated diolefines containing 4 to 6 carbon atoms, such as butadiene, isoprene, 2:3-dimethylbutadiene and chloroprene.

(e) Methylol compounds of acrylic acid and methacrylic acid amide of the general Formula II II 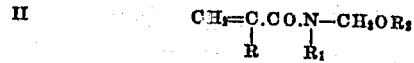

in which R represents a hydrogen atom or a methyl group, $R_1$ represents a hydrogen atom or an alkyl, aralkyl or aryl group and $R_2$ represents an alkyl or cycloalkyl group for example methyl ethyl, n-propyl, isopropyl, n-butyl, isobutyl or cyclohexyl.

(f) Mannich bases of acrylic acid and methacrylic acid amide of the general Formula III III 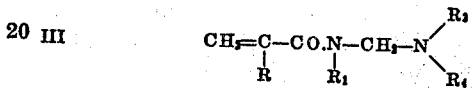

in which R and $R_1$ have the same meaning as in Formula II and $R_3$ and $R_4$ represent alkyl, cycloalkyl or aralkyl groups or together represent a heterocyclic radical, for example the morpholine radical. Suitable compounds of this type are mentioned in our copending U.S. patent application Serial No. 851,971.

In addition, quite a number of other olefinically unsaturated monomers may be co-polymerized, but they are generally not of great technical importance. Moreover, monomers having a cross-linking effect and containing several olefinically unsaturated groups may be added in quantities of about 0.01 to 10% calculated on the total weight of monomers, for example glycol diacrylate, glycol dimethacrylate, acrylic acid and/or methacrylic acid allyl esters, divinyl benzene, triacryloyl-perhydro-s-triazine, triallyl cyanurate or substitution products of the said compounds.

The choice of these monomers depends on the properties required of the copolymers. It is advantageous to combine one or more monomers having a strengthening action with an elasticising monomer to increases the hardness of the polymers, this mixtures then being subjected to co-polymerisation.

Elasticising monomers in this sense are aliphatic conjugated diolefines, esters of acrylic acid with more than two carbon atoms in the ester group, and ester of methacrylic acid with more than four carbon atoms in the ester group. The proportion of elasticising monomers should preferably be 40 to 70% of the co-monomers used in addition to the monomers used according to the invention.

Monomers having a strengthening action, as defined above, are styrene and substituted styrenes on one hand and acrylonitrile or methacrylonitrile and vinyl chloride on the other hand. The last mentioned monomers are preferably added in quantities corresponding to the difference between the elasticising monomers and the reinforcing monomers.

The aqueous co-polymer dispersions of the present process are obtained by co-polymerising the above mentioned monomers in aqueous dispersion using emulsifying agents in known manner. Either cationic or anionic or non-ionic emulsifying agents or combinations thereof may be used.

Examples of suitable emulsifiers for the present process are: Anionic emulsifiers such as the salts of long chained alkyl monocarboxylic acids (fatty acids, resinic acids), salts of acid alkyl sulphuric acid esters, salts of alkyl sulpho acids and alkaryl sulphonic acids, salts of fatty acid condensation products with hydroxyalkyl carboxylic acids, aminoalkyl carboxylic acids and several others, and finally the salts of sulphonated ethylene oxide adducts. Examples of cationic emulsifiers are salts of alkylamines, aryl-, alkaryl- or resinic amines and inorganic or organic acids and salts of quaternary ammonium compounds.

Suitable non-ionic emulsifiers are the known reaction products of ethylene oxide with long chained fatty alcohols or phenols, and it is preferable to use reaction products having more than 10 ethylene oxide units.

The total quantity of the above mentioned emulsifiers may be 0.5 to 20% calculated on the total quantity of monomers, and is preferably between 2 and 10%.

A special method of carrying out the process of the invention comprises using non-ionic emulsifiers and at the same time at most 0.5% of cationic or anionic emulsifiers, calculated on the polymer. Latices of very high stability are thereby obtained. If the polymer at the same time contains COOH—, CONH$_2$—, SO$_3$H— or other hydrophilic groups, the latices are highly re-emulsifiable. Re-emulsifiability is taken to means that the films obtained from the co-polymer latex by drying at room temperature and at a pH of about 7 may still be redispersed directly in water after a certain time.

Although polymerisation is preferably carried out at temperatures below 50° C., temperatures in the range of 10° C. to 80° C. may be used.

The pH value to be observed during the preparation of the co-polymers may vary within wide limits, for example between pH 3 and pH 9, but in the preparation of re-emulsifiable latices, the pH should be kept between 4 and 6.

Re-emulsifiable latices are obtained by co-polymerising the above-mentioned monomers in aqueous dispersion and at a pH between 4 and 6 and temperature between 20 and 50° C. with olefinically unsaturated monomers containing hydrophilic groups, using non-ionic emulsifying agents, and then adjusting the dispersion obtained to a pH value between about 6.5 to 9. Compounds which regulate the molecular weight, such as long chained alkyl mercaptans, diisopropyl-xanthogenate and others may be included in the polymerisation.

The polymerisation catalysts that may be used include inorganic per-compounds such as potassium or ammonium persulphate, hydrogen peroxide, percarbonates, organic peroxy compounds such as acyl peroxides (for example benzoyl peroxide), alkyl hydroperoxides (such as tertiary-butyl hydroperoxide), cumol hydroperoxide, p-menthane hydroperoxide, and dialkyl peroxides (such as di-tertiary-butyl peroxide). The inorganic or organic per-compounds are preferably used in known manner in combination with reducing agents. Suitable reducing agents are, for example, salts of acids of sulphur, wherein sulphur has a valency of 4 and lower, such as sodium pyrosulphite or bisulphite, sodium formaldehyde sulphoxylate or alkanolamines such as triethanolamine.

The quantity of catalyst used lies within the limits generally used for polymerisations of this type, i.e. between 0.01 to 5% calculated on the total quantity of monomers used and whereby in case of redox systems about equimolar amounts of reducing agent in relation to oxidizing agent are employed.

The co-polymers of the dispersions described have a susbstantially linear structure and contain methylene groups which are split at elevated temperatures and/or under the action of acid catalysts and at the same time effect cross-linking of the copolymers with formation of insoluble cross-linking products. Owing to their property of being converted into insoluble cross-linked products even under mild conditions, the said polymers and co-polymers may be used for the manufacture of shaped articles of any kind, such as coatings, impregnations of paper, leather etc. and adhesives. For this purpose, the dispersions may be adjusted to an acid pH, preferably 2 to 5, by means of suitable acids or acidifying compounds for example inorganic acids such as hydrochloric acid, sulphuric acid, phosphoric acid; organic acids having at least an acidity as acetic acid such as acetic acid itself or trichloroacetic acid, acidic salts of a strong acid and a weak base such as ammonium chloride or acidic phosphates, the dispersion then being applied to suitable supports on which the water evaporates at elevated temperatures (i.e. about 80° C. and more) and the polymers are thereby cross-linked. It is also possible to effect cross-linking merely by the action of heat, in which case temperatures of about 80 to 200° C., preferably 100 to 150° C. have been found to be suitable. According to a preferred embodiment of this invention, cross-linking is effected by applying both, heat and acidic medium at the same time. Temperatures of between 80 and 150° C. over periods between 30 seconds and about 5 minutes have been proved advantageous in the latter case.

Although in principle it is possible to use the described re-emulsifiable self-cross-linking co-polymer emulsions without adding cross-linking agents for the manufacture of formed articles, it may in some cases be advantageous to add to the dispersions additional cross-linking agents, for example water-soluble condensation products of aldehydes, especially formaldehyde, with urea, malamine or alkyl methylol ether derivatives of such compounds, in order to effect additional cross-linking of the formed articles.

In the following examples, the parts given are parts by weight unless otherwise indicated.

*Examples 1–2–A*

A mixture of 116 parts of acrylic acid butyl ester and 73 parts of styrene in a solution of 5 parts of acrylic amide in 300 parts of water, 6 parts of a sodium salt of an alkyl sulphuric acid ester containing 10 to 16 carbon atoms and 6 parts of a reaction product of hydroxydiphenyl methane is emulsified with 13 to 15 mols of ethylene oxide and 16 parts of a compound taken from the following table in a reaction vessel equipped with stirrer and thermometer. When the temperature has been raised to 40° C., 0.8 part of potassium persulphate and 1.2 parts of sodium pyrosulphite are added. The polymerisation is allowed to proceed at about 45° C. A copolymer emulsion with 38% solids content is obtained. A portion of this copolymer emulsion is adjusted to pH 2.0 and left to dry on glass plates at room temperature. After 20 hours, the polymer film formed is tested for its solubility in dimethyl formamide. The results obtained are summarised in the following table ("x" indicates insolubility and "y" partial solubility under swelling).

| Number of Experiment | Compound | Solubility in dimethyl formamide | |
|---|---|---|---|
| | | pH 2 | pH 7 |
| 1 | $CH_2=C(CH_3)-CO-NH-CH_2-N\begin{pmatrix}CH_2-CH_2-CH_2\\CO-CH_2-CH_2\end{pmatrix}$ | x | x |
| 2 | $CH_2=C(CH_3)-CO-NH-CH_2-N\begin{pmatrix}CH_2-CH_2\\CO-CH_2\end{pmatrix}$ | x | x |
| A | $CH_2=C(CH_3)-CO-NH-CH_2-O-CH_3$ | y | y |

Example A is carried out for comparison, using the known co-polymer emulsions which contain methylol methyl ether groups. From this series of experiments it is found that the copolymer emulsions according to the invention are considerably easier to cross-link than products used in the prior art.

In the foregoing examples the same results are obtained when applying the analogous acrylic acid amide derivatives instead of the methacrylic acid amide derivatives.

Example 3

A solution of 430 parts of water, 20 parts of the reaction product of 1 mol of cetyl alcohol and 13 to 15 parts of ethylene oxide is placed in a reaction vessel equipped with a stirrer. About $\frac{1}{10}$ of a monomer mixture of 200 parts of butyl acrylate, 10 parts of acrylic acid and 30 parts of methyl acrylate, 98 parts of acrylonitrile and 0.2 part of n-dodecyl mercaptan are emulsified in this solution. After replacing air by nitrogen and heating the mixture to 35° C., polymerization is started by adding 0.5 part of potassium bisulphate and 1.0 part of sodium pyrosulphite. From four dropping funnels, (a) the remaining part of the monomer mixture, (b) a solution of 12 parts of the compound

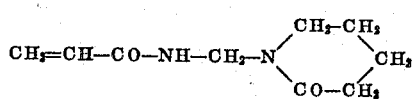

in 100 parts of water, (c) 3 parts of sodium pyrosulphite in 50 parts of water and (d) 2 parts of potassium persulphate in 170 parts of water are allowed to run in uniformly over 3 hours. The polymerisation temperature is kept at 40 to 45° C. by an external cooling means. Polymerisation is completed when the product has been stirred for another 1 to 2 hours. The dispersion, which has a concentration of about 35%, is adjusted to a pH of about 7.

After a few drops of this dispersion have been rubbed dry in the palm of the hand, they may be mixed with water to form the original dispersion again.

Films prepared from the dispersion show only very slight swelling with water when they have been heated to 120° C. or left to lie at room temperature for some time.

In this example the corresponding methacrylic acid amide derivative may be employed without disadvantage.

We claim:

1. A storage-stable aqueous dispersion of a linear copolymer of an ethylenically unsaturated monomer having at least one terminal $CH_2=C<$ group and of between 0.5 and 50% by weight, based on the total weight of monomers, of a monomer of the formula:

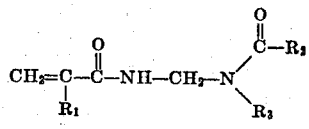

wherein $R_1$ is a member selected from the group consisting of hydrogen, methyl and chlorine; $R_2$ is a member selected from the group consisting of alkyl having 1-8 carbon atoms, aryl, cycloalkyl and aralkyl, $R_3$ is a member selected from the group consisting of hydrogen, alkyl having 1-8 carbon atoms, aryl, cycloalkyl and aralkyl and wherein when $R_2$ and $R_3$ are taken together with the adjacent nitrogen atom and carbonyl group, they represent the atoms completing a heterocyclic ring substituent including said nitrogen atom.

2. The storage-stable aqueous dispersion of claim 1 wherein said heterocyclic ring substituent including said nitrogen atom is of the formula:

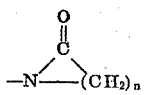

wherein $n$ is a whole number of from 3 to 5, inclusive.

3. The storage-stable aqueous dispersion of claim 2 wherein $n$ is 3.

4. The storage-stable aqueous dispersion of claim 2 wherein $n$ is 4.

5. The storage-stable aqueous dispersion of claim 2 wherein $n$ is 5.

6. The storage-stable aqueous dispersion of claim 1 wherein $R_3$ is hydrogen and $R_2$ is alkyl of from 1-8 carbon atoms.

7. The storage-stable aqueous dispersion of claim 1 wherein said ethylenically unsaturated monomer having at least one terminal $CH_2=C<$ group is a member selected from the group consisting of aliphatic conjugated diolefins of 4-6 carbon atoms, monovinyl aromatic compounds, vinyl chloride, vinylidene chloride, acrylic and methacrylic acid esters of monohydric saturated alcohols of 1-12 carbon atoms, diesters of alpha, beta-ethylenically unsaturated dicarboxylic acids, vinyl alkyl ethers, and acrylonitrile.

8. The storage-stable aqueous dispersion of claim 1 wherein the ethylenically unsaturated monomer having at least one terminal $CH_2=C<$ group is o fthe formula:

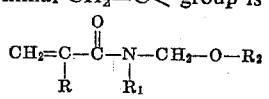

wherein each of R and $R_1$ is a member selected from the group consisting of hydrogen and methyl and $R_2$ is a member selected from the group consisting of alkyl of from 1-8 carbon atoms and cycloalkyl.

9. The process of producing a storage-stable aqueous dispersion which comprises polymerizing the monomers set forth in claim 1 in the specified proportions in an aqueous dispersion at a pH of between 3 and 9 and at a temperature between 20 and 50° C. in the presence of up to 20% by weight, based on the total weight of monomers of a nonionic emulsifier and up to 0.5% by weight, based on the total weight of monomers, of an ionic emulsifier.

References Cited by the Examiner

UNITED STATES PATENTS 2,966,481   12/60   Brace _____ 260—80.3

OTHER REFERENCES

Brace et al.: J. of Org. Chem., Dec. 27, 1961, pp. 5176–5180.

Schildknecht: "Vinyl and Related Polymers," John Wiley & Sons, New York (1952), pp. 244–255.

MURRAY TILLMAN, *Primary Examiner.*

LEON J. BERCOVITZ, *Examiner.*